United States Patent
Gether et al.

(10) Patent No.: US 10,218,410 B2
(45) Date of Patent: Feb. 26, 2019

(54) INTERFACE CIRCUITS AND COMMUNICATION SYSTEM FOR COUPLING A HOST DEVICE TO AN ACCESSORY DEVICE AND METHOD FOR COMMUNICATION BETWEEN SUCH DEVICES

(71) Applicant: ams AG, Unterpremstaetten (AT)

(72) Inventors: Horst Gether, Bad Gleichenberg (AT); Helmut Theiler, Lieboch (AT)

(73) Assignee: ams AG, Unterpremstätten (AT)

( * ) Notice: Subject to any disclaimer, the term of this patent is extended or adjusted under 35 U.S.C. 154(b) by 0 days.

(21) Appl. No.: 15/514,483

(22) PCT Filed: Aug. 21, 2015

(86) PCT No.: PCT/EP2015/069275
§ 371 (c)(1),
(2) Date: Mar. 24, 2017

(87) PCT Pub. No.: WO2016/055210
PCT Pub. Date: Apr. 14, 2016

(65) Prior Publication Data
US 2017/0288728 A1    Oct. 5, 2017

(30) Foreign Application Priority Data

Oct. 6, 2014   (EP) .................................. 14187783

(51) Int. Cl.
*H04B 3/54*     (2006.01)
*H04M 1/60*     (2006.01)
*H04M 1/725*    (2006.01)

(52) U.S. Cl.
CPC ............ *H04B 3/54* (2013.01); *H04M 1/6058* (2013.01); *H04M 1/72527* (2013.01)

(58) Field of Classification Search
CPC .... H04B 3/54; H04M 1/6058; H04M 1/72527
See application file for complete search history.

(56) References Cited

U.S. PATENT DOCUMENTS

2012/0290742 A1   11/2012   Sun et al.

FOREIGN PATENT DOCUMENTS

| EP | 2501114 A1 | 10/2012 |
|----|------------|---------|
| EP | 2654168 A1 | 10/2013 |
| WO | 2010104541 A1 | 9/2010 |

*Primary Examiner* — Vineeta S Panwalkar
(74) *Attorney, Agent, or Firm* — Fish & Richardson P.C.

(57) ABSTRACT

A host interface circuit operates in a power mode when connected to an accessory device compatible with a power supply via a first line of a data cable. During power mode, the host interface circuit couples a power regulator to the first line. The host interface circuit operates in a legacy mode when connected to an accessory device not compatible with such a power supply and couples the legacy terminal to the first line during legacy mode. An accessory interface circuit configured to operate in a power mode when connected to a host device capable of a power supply via a first line couples a power input of an active device to the first line and a data input of the active device to a second line during power mode.

17 Claims, 3 Drawing Sheets

INTERFACE CIRCUITS AND COMMUNICATION SYSTEM FOR COUPLING A HOST DEVICE TO AN ACCESSORY DEVICE AND METHOD FOR COMMUNICATION BETWEEN SUCH DEVICES

FIELD OF THE INVENTION

The present disclosure relates to interface circuits, in particular a host interface circuit and an accessory interface circuit, for coupling a host device to an accessory device, in particular via a data cable, and to a method for communication between a host device and an accessory device.

BACKGROUND OF THE INVENTION

An accessory device, as for example an audio device like a headphone, a hands free set or a speaker system, may for example comprise a passive device, for example a microphone. The accessory device may also contain an active device, for example an active audio device. The active audio device may for example contain an active noise compensation, ANC, device or an active audio speaker device. Such active devices are commonly powered for example by means of batteries in the accessory device.

On the other hand, the accessory device is commonly connected to a host device, for example a mobile phone, a smartphone, a tablet computer, a personal computer, a television or the like. For example in case the accessory device is an audio device, the connection may be implemented via a standard audio cable, for example a standard 4-pole or 3-pole audio cable for example with 3.5 mm jacks. The host device commonly contains a battery or an external power supply.

SUMMARY OF THE INVENTION

The present disclosure provides an improved concept for coupling a host device to an accessory device and a communication between such devices that allows for a power supply via a data cable connecting the devices.

According to the improved concept, a host interface circuit and/or an accessory interface circuit operate in a legacy mode and, if the interface circuits are compatible for a power supply via a data cable connecting them, in a power mode. The legacy mode is used when one of the interface circuits is not compatible with such a power supply. Then, a first line, for example a microphone line, of the data cable is connected to a legacy terminal of the host device, for example for biasing a microphone of the accessory device. The legacy mode may also serve as an initialization mode in the sense that the host interface circuit and/or the accessory interface circuit may operate in the legacy mode after start-up, when it is still undetermined whether the interface circuits are compatible for a power supply via the data cable. When operating in the power mode the first line is used for the power supply.

According to the improved concept, a host interface circuit for being implemented in a host device with a processing unit is provided. The host interface circuit is thereby suitable for coupling the host device to an accessory device via a data cable. The host interface circuit comprises a power regulator and a legacy terminal. The host interface circuit is configured to, when connected to the accessory device, operate in a legacy mode of operation. The host interface circuit is further configured to operate in a power mode of operation when connected to an accessory device being compatible with a power supply via a first line of the data cable. When operating in the power mode, the host interface circuit couples the power regulator to the first line.

Furthermore, the host interface circuit may operate in the legacy mode of operation when connected to an accessory device being not compatible with a power supply via the first line. However, even if the host interface circuit is connected to an accessory device that is compatible with a power supply via the first line, the host interface circuit may still operate in the legacy mode, for example after a start-up. Furthermore, the host interface circuit is configured to couple the legacy terminal to the first line when operating in the legacy mode.

By means of a host interface circuit according to the improved concept, it is possible to operate both types of accessory devices, namely such that are compatible with, in particular rely on, a power supply via the first line and such that are not compatible with such power supply. Thereby, the legacy mode of operation supports the operation of the latter type of accessory devices.

On the other hand, a host interface circuit according to the improved concept allows for operation of an accessory device for example containing an active device, for example an active audio device, to be powered via the first line. The data cable is for example a common audio cable, for example a 4-pole audio cable. The first line may for example be a microphone line.

The accessory interface circuit may be implemented as an integrated circuit or as discrete circuitry or as a combination of both, for example within the accessory device. The host interface circuit may be implemented as an integrated circuit or as discrete circuitry or as a combination of both, for example within the host device.

In some implementations, the host interface circuit is configured to operate in the legacy mode after a start-up, for example directly after the start-up, of the host interface circuit. The host interface circuit is further configured to detect an identification signal being received from the accessory device via the first line, when the host device is connected to the accessory device.

Then, the host interface circuit may determine if the accessory device is compatible with the power supply via the power regulator based on the identification signal.

In these implementations, the legacy mode acts directly after the start-up as a kind of initialization mode, during which the host interface device has not determined yet whether the accessory device is compatible with the power supply via the first line, in particular via the power regulator. If the host interface device has determined that the accessory device is compatible with the power supply via first line, the host interface device may for example switch from operating in the legacy mode to operating in the power mode. If the host interface device has determined that the accessory device is not compatible with the power supply via first line, the host interface device may for remain operating in the legacy mode.

In several implementations, the host interface circuit is suitable for being implemented in a host device being a mobile communication device and/or a sound reproducing device. In particular, a mobile phone, a smart phone, a tablet computer or a portable music player may be suitable as a host device.

Such mobile communication devices and sound reproducing devices often provide a possibility for handling for example telephone calls or spoken commands from the accessory device.

In several implementations of the host interface circuit, the host interface circuit is configured to operate in a call mode of operation when connected to an accessory device being compatible with a power supply via the first line. The host interface circuit is further configured to, when operating in the call mode, couple the power regulator to the first line and to couple the legacy terminal to a second line of the data cable. Preferably the second line of the data cable is a a data line, for example an audio line, for example a right or a left audio line of the data cable.

In several implementations, the host interface circuit is configured to detect a host call signal from the processing unit and to detect an accessory call signal received from the accessory device via the first line. The host interface circuit is further configured to trigger the operation in the call mode when at least one of the host call signal and the accessory call signal is detected.

For example, if the host device receives a phone call, a user can commonly accept the phone call via the host device or via the accessory device. When the user accepts the phone call via the host device, the host call signal is generated from the processing unit and detected by the host interface circuit. On the other hand, if the user accepts the phone call via the accessory device, the accessory call signal is generated by the accessory device and transmitted to the host interface circuit via the first line. In both cases the host interface circuit triggers the operation in the call mode.

In some implementations, the host interface circuit is configured to generate an uplink call signal to be transmitted to the accessory device via the first line after the triggering of the operation in the call mode.

The transmission of the uplink call signal to the accessory device enables for example the accessory device to initiate a corresponding reaction on its side, for example when the host interface circuit has triggered the operation in the call mode as a response to the host call signal.

In some implementations, the host interface circuit is configured to detect a button signal from the accessory device via the first line and to generate an adapted button signal based on the button signal. The host interface circuit provides the adapted button signal to the processing unit.

The button signal may for example be generated by the accessory device upon a user pressing a button associated with the accessory device. Such a button can for example be a volume regulating button or a call button for accepting a phone call or for placing a spoken command to the host device. In particular, the button signal may also comprise the accessory call signal.

According to the improved concept, also an accessory interface circuit to be implemented in an accessory device containing an active device is provided. The accessory interface circuit is suitable for coupling the accessory device to a host device via a data cable. The accessory interface circuit is also configured to operate in a power mode of operation when connected to a host device being capable of providing a power supply for operating the active device via a first line of the data cable. The accessory device is also configured to couple a power input of the active device to the first line when operating in the power mode and to couple a data input of the active device to a second line of the data cable when operating in the power mode.

The active device may for example be an active audio device, such as for example an active noise compensation device or an active audio speaker system. The active device can also be a sensor device to be operated with a power supply, in particular via the first line. In general any active device that can be powered by the power regulator may serve as an active device according in the sense of the improved concept.

The first line of the data cable is preferably a microphone line of the data cable while the second line of the data cable may be a data line, for example an audio line, for example a left or a right audio line.

In some implementations, the accessory interface circuit is configured to generate an identification signal to be transmitted to the host device via the first line when the accessory device is connected to the host device. The accessory interface circuit is further configured to detect an answer signal being received from the host device via the first line in response to the identification signal. Then, the accessory interface circuit determines if the host device is capable of providing a power supply for operating the active device based on the answer signal.

In particular, if the host device is not capable of providing a power supply for operating the active audio device, the host device may not be able to actually generate and transmit the answer signal to the accessory device. If no signal is detected from the accessory device in response to the identification signal, this is in the present wording to be understood as detecting an answer signal identifying that the host device is not capable of providing a power supply for operating the active device.

In several implementations, the accessory interface circuit is implemented or suitable for being implemented in an accessory device wherein the active device is an active audio device and comprises a microphone, in particular a passive microphone. In such implementations the accessory interface circuit is configured to operate in a legacy mode of operation when connected to a host device being not capable of providing a power supply for operating the active device via the first line. The accessory interface circuit is also configured to couple the microphone to the first line when operating in the legacy mode.

In such implementations, the accessory device effectively acts as a device without the active device, for example an active noise cancelling device, but may use the microphone instead. In this way an accessory device comprising an accessory interface circuit according to the improved concept can be operated with a host device comprising a host interface circuit according to the improved concept as described or also with a host device that does not comprise a host interface circuit according to the improved concept. Legacy support may be ensured in this way.

In several implementations, the accessory device is configured to operate in a call mode of operation if the host device is capable of providing a power supply for operating the active device via the first line. The accessory interface circuit is configured to, when operating in the call mode, couple the power input of the active device to the first line and the data input of the active device to a third line of the data cable when operating in the call mode. The third line is preferably a data line, a for example an audio line. In implementations where the second line is a right audio line, the third line is for example a left audio line and vice versa. Furthermore, the accessory interface circuit is configured to couple the microphone to the second line when operating in the call mode.

In the call mode of operation, the active device is still being operated and supplied with power via the first line. However, also the microphone is connected to the host device. To this end the third line, for example a left audio line, which may be used for transmitting a left audio signal from the accessory device to the host device during the power mode, may be used during the call mode to transmit also the right audio data from the audio device to the host device. In this way, effectively a monophonic operation of the audio device is achieved.

According to several implementations, the accessory interface circuit is configured to detect an actuation signal from a control means of the accessory device. The accessory interface circuit is further configured to provide an accessory call signal depending on the actuation signal to the host device via the first line and to detect an uplink call signal received from the host device via the first line. The accessory interface circuit is further configured to trigger the operation in the call mode when at least one of the uplink call signal and the actuation call is detected.

According to some implementations, the accessory interface circuit is configured to detect an actuation signal, which may for example also comprise the actuation call signal, from the control means. The accessory interface circuit provides a button signal, which may for example comprise the accessory call signal, to the host device via the first line.

According to the improved concept, also a communication system is provided. The communication system comprises a host interface circuit according to the improved concept and an accessory interface circuit according to the improved concept that may be coupled via a data cable.

According to the improved concept, also a method for communication between a host device and an accessory device is provided. The method comprises connecting the host device and the accessory device via a data cable and detecting, by means of the host device, whether the accessory device is compatible with a power supply via a first line of the data cable. The method further comprises operating the host device in a power mode of operation or in a legacy mode of operation depending on the detection. When the host device is operated in the power mode, the method comprises providing a power supply from the host device to the accessory device via the first line. When the host device is operated in the legacy mode, the method comprises coupling a legacy terminal of the host device to the first line.

According to the improved concept, also a method for communication between a host device and an accessory device with an active device is provided. The method comprises connecting the host device and the accessory device via a data cable and detecting, by means of the accessory device, whether the host device is capable of providing a power supply for operating the active device via a first line of the data cable. The method further comprises operating the accessory device in a power mode of operation depending on the detection. Furthermore, the method comprises coupling a power input of the active device to the first line when the accessory device is operated in the power mode and coupling a data input of the active device to a second line of the data cable when the accessory device is operated in the power mode.

According to several implementations of the method, the host device is capable of providing a power supply for operating the active device. Then the method may further comprise generating an identification signal by means of the accessory device and transmitting the identification signal to the host device via the first line. Then, the host device is operated in the power mode. The method comprises detecting an answer signal, which may for example be a change of an impedance due to the operation of the host device in the power mode, in response to the identification signal. Then, the accessory device is operated in the power mode.

The method further comprises, when the host device is operated in the power mode, providing a power supply from the host device to the accessory device via the first line. When the accessory device is operated in the power mode, the method further comprises coupling a power input of the active device to the first line and coupling a data input of the active device to a second line of the data cable.

Several further implementations of the methods for communication between host device and an accessory device are readily derived from the several implementations of the host interface circuit and the accessory interface circuit. In particular, several implementations of the method are derived readily from combinations of implementations of the host interface circuit with implementations of the accessory interface circuit.

BRIEF DESCRIPTION OF THE DRAWINGS

In the following the improved concept is explained in detail with the aid of exemplary implementations by reference to the drawings. Components that are functionally identical or have an identical effect may be denoted by identical references. Identical components and/or components with identical effects may be described only with respect to the figure where they first occur; their description is not necessarily repeated in subsequent figures.

In the drawings.

DETAILED DESCRIPTION

In all figures, a data cable 4PAC is shown, comprising a first line LM, for example a microphone line, a second line LR, for example a right audio line, a third line LL, for example a left audio line and a fourth line LG, being a ground line connected to a ground terminal. The data cable 4PAC is for example a common 4-pole audio cable, for example connected to a host device HDEV and an accessory device ADEV by means of 4-pole audio jacks, for example 3.5 mm audio jacks. Of course other 4-pole cables may be used including but not limited to audio cables with 2.5 mm jacks or 6.35 mm jacks.

In all figures, an accessory device ADEV comprising control means BTNS is shown. The control means BTNS may for example comprise buttons and/or switches for changing a volume setting and for accepting, declining and/or ending for example a telephone call.

Figure 1:
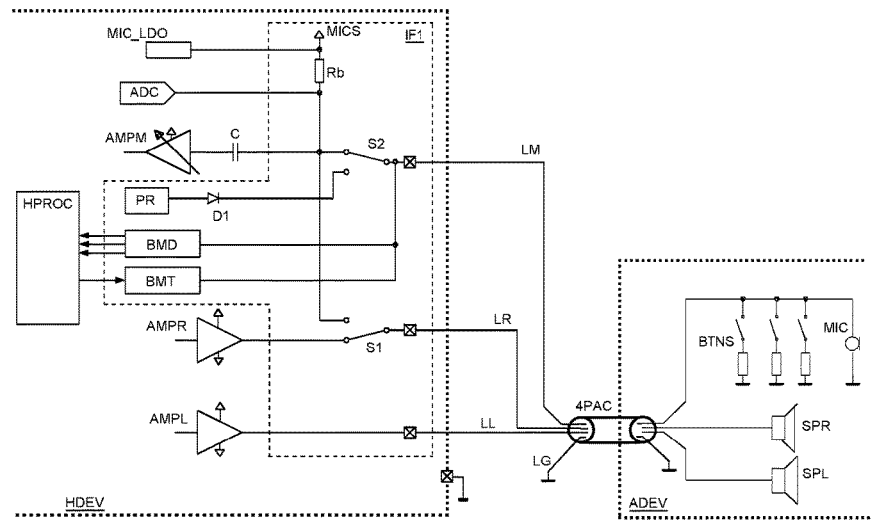
FIG. 1 shows an exemplary implementation of a host interface circuit according to the improved concept operating in the legacy mode and connected to an accessory device.

In FIG. 1, an exemplary implementation of a host interface circuit IF1 according to the improved concept operating in the legacy mode is shown. The host interface circuit IF1 is implemented in a host device HDEV which is connected to an accessory device ADEV by means of a data cable 4PAC.

The host interface circuit IF1 is connected to the first line LM, the second line LR and the third line LL. The host interface circuit IF1 comprises a first switch S1 coupling the second line LR to a right audio amplifier AMPR of the host device HDEV. Furthermore, the host interface circuit IF1 couples the third line LL to a left audio amplifier AMPL of the host device HDEV. However, in alternative implementations, the coupling of the third line LL to the left audio amplifier AMPL is not necessarily comprised by the interface circuit IF1. The host interface circuit IF1 comprises a burst mode detector BMD and a burst mode transmitter BMT, both of which are coupled between the first line LM and a processing unit HPROC of the host device HDEV.

A power regulator PR and a first diode D1 connected to the power regulator PR are comprised by the host interface circuit IF1 but are, during the depicted legacy mode of operation, not connected to the first line LM. The power regulator PR may for example be implemented as a switching regulator or as a linear voltage regulator, in particular as a low-dropout regulator. The host interface circuit IF1 also comprises a legacy terminal MICS connected to the first line LM via a second switch S2 of the host interface circuit IF1 and a resistor Rb connected in series between the second switch S2 and the legacy terminal MICS. In the shown example, the host device HDEV further comprises a microphone voltage regulator MIC_LDO with a terminal connected between the legacy terminal MICS and the resistor Rb, an analog-digital converter ADC with a terminal connected between the resistor Rb and the second switch S2 and a microphone amplifier AMPM with a terminal connected between the resistor Rb and the second switch S2 via a capacitor C. The microphone voltage regulator MIC_LDO may for example be implemented as a linear voltage regulator, in particular as a low-dropout regulator.

The accessory device ADEV comprises a microphone MIC, in particular a passive microphone, connected to the first line LM and a control means BTNS, implemented in the shown example as three switches or buttons, connected between the microphone MIC and the first line LM. Furthermore, the accessory device ADEV comprises a right speaker SPR connected to the second line LR and a left speaker SPL connected to the third line LL. In this example, the accessory device may for example be a common headset. Consequently, it may not be compatible with a power supply via the first line LM.

It is highlighted, that the coupling of the microphone MIC to the legacy terminal MICS via the first line LM may not regarded as a power supply in the sense of the improved concept. Rather, the legacy terminal MICS and the resistor Rb provide a bias for the microphone to be operated. In fact, the resistor Rb acts as a pull-up resistor for limiting a current into the first line LM during the legacy mode. In particular, it would not be possible to power an active device, for example an active noise compensation device via the legacy terminal MICS and the resistor Rb.

After a start-up of the host device HDEV, the host interface circuit IF1 is connected as shown in FIG. 1 and therefore operates in the legacy mode of operation. The accessory device ADEV does not contain an active device that could be powered for example by the power regulator PR via the first line. Therefore, the host interface circuit IF1 stays in the legacy mode of operation. In this way the microphone MIC is connected via the first line LM to the legacy terminal MICS via the resistor Rb. The left speaker SPL and the right speaker SPR are connected via the third line LR and the second line LL, respectively, to the left audio amplifier AMPL and the right audio amplifier AMPR, respectively.

If a button of the control means BTNS is being pressed, the microphone MIC is short circuited and the analog-digital converter ADC is for example used to monitor a voltage on the first line LM. Depending on a voltage level on the first line LM, the processing unit HPROC can for example determine which button of the control means BTNS has been pressed at the side of the accessory device ADEV.

In the shown way, a host device HDEV with a host interface circuit IF1 may be used in combination with a common accessory device ADEV, for example a common headset.

Figure 2:
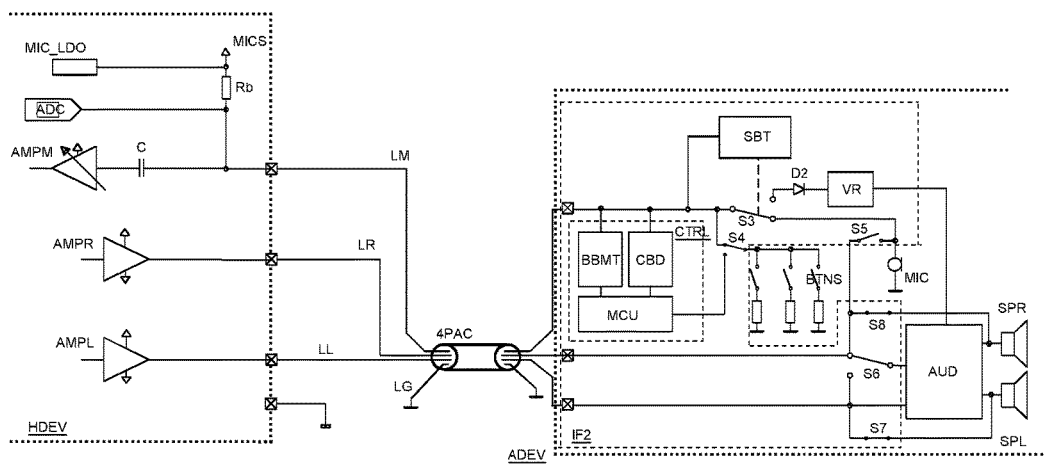
FIG. 2 shows an exemplary implementation of an accessory interface circuit according to the improved concept operating in the legacy mode and connected to a host device.

FIG. 2 depicts a complementary setup, showing an exemplary implementation of an accessory interface circuit IF2 according to the improved concept implemented in an accessory device ADEV. The accessory interface circuit IF2 operates in the legacy mode and is connected to a host device HDEV via a data cable 4PAC.

Here, the host device HDEV comprises right amplifier and a left audio amplifier AMPR connected to the third line LR and the fourth line LL, respectively. The host device HDEV also comprises a legacy terminal MICS connected to the first line LM and a resistor Rb connected in series between the first line LM and the legacy terminal MICS. In the shown example, the host device HDEV further comprises a microphone voltage regulator MIC_LDO with a terminal connected between the legacy terminal MICS and the resistor Rb, an analog-digital converter ADC with a terminal connected between the resistor Rb and the first line LM and a microphone amplifier AMPM with a terminal connected between the resistor Rb and the first line LM via a capacitor C.

The accessory device ADEV comprises a microphone MIC, in particular a passive microphone, a control means BTNS, implemented in the shown example as three switches or buttons, and an active device AUD, in particular an active audio device AUD. Furthermore, the accessory device ADEV comprises a right speaker SPR and a left speaker SPL connected to the active device AUD.

The accessory interface circuit IF2 comprises a third switch S3 connecting the microphone MIC to the first line LM during the depicted legacy mode. The accessory interface circuit IF2 further comprises a second diode D2 and a voltage regulator VR connected in series and the voltage regulator VR connected to a power input of the active device AUD. In the depicted legacy mode, the second diode D2, the voltage regulator VR and the power input of the active device AUD are disconnected from the first line LM. The voltage regulator VR is an optional component, which alternative implementations may not contain.

The control means BTNS are connected to the first line via a fourth switch S4. The accessory interface circuit IF2 also comprises a control unit CTRL with a button burst mode transmitter BBMT and a call burst detector CBD connected to the first line LM and with a microcontroller MCU connected to the button burst mode transmitter BBMT and the call burst detector CBD. In the legacy mode, the microcontroller MCU is disconnected from the control means BTNS via the fourth switch S4.

A start-up burst mode transmitter SBT is comprised by the accessory interface circuit IF2 and connected to the first line LM. In alternative implementations, the start-up burst mode transmitter SBT may be comprised by the control unit CTRL, for example by the microcontroller MCU. Furthermore, the accessory interface circuit IF2 comprises a fifth switch S5 disconnecting the microphone MIC from the second line LR, a sixth switch S6 connecting a data input of the active device AUD to the second line LR, a seventh switch S7 connecting the left speaker SPL to the third line LL and an eighth switch S8 connecting the right speaker SPR to the third line LR.

As described with respect to FIG. 1, also in FIG. 2 the microphone MIC is biased by the legacy terminal MICS and the resistor Rb. After a start-up of the accessory interface device IF2, the start-up burst mode transmitter SBT may be activated and configured to generate an identification signal, for example a burst signal, at the first line LM. The identification signal may for example be generated by modulating a signal to the first line LM. In particular, the modulated signal may feature a different signal amplitude and/or frequency, for example a higher signal amplitude, than a signal that may be generated by the microphone MIC. The identification signal may for example feature a frequency in or below the kHz range, for example in a low kHz range. In particular, the identification signal may feature a frequency below 20 kHz or above 20 kHz. However, since in the shown example the host device HDEV has no means to detect the identification signal, the host device HDEV does not change its operation.

The start-up burst mode transmitter SBT may have a timeout function, that is it may be configured to stop generating the identification signal after a predefined time. Then, the switching configuration may remain as shown in FIG. 2.

In such a situation, the accessory device ADEV can be used with the host device HDEV for example on a basic level, that is for example utilizing the microphone MIC, the speakers SPR, SPL and the control means BTNS. On the other hand, the active device AUD is effectively bypassed and may not be used during the legacy mode. The seventh switch S7 and the eighth switch S8 that may achieve the bypassing may for example be implemented as mechanical switches or for example as depletion mode transistor switches that may be external to or integrated into the active device AUD.

Figure 3:
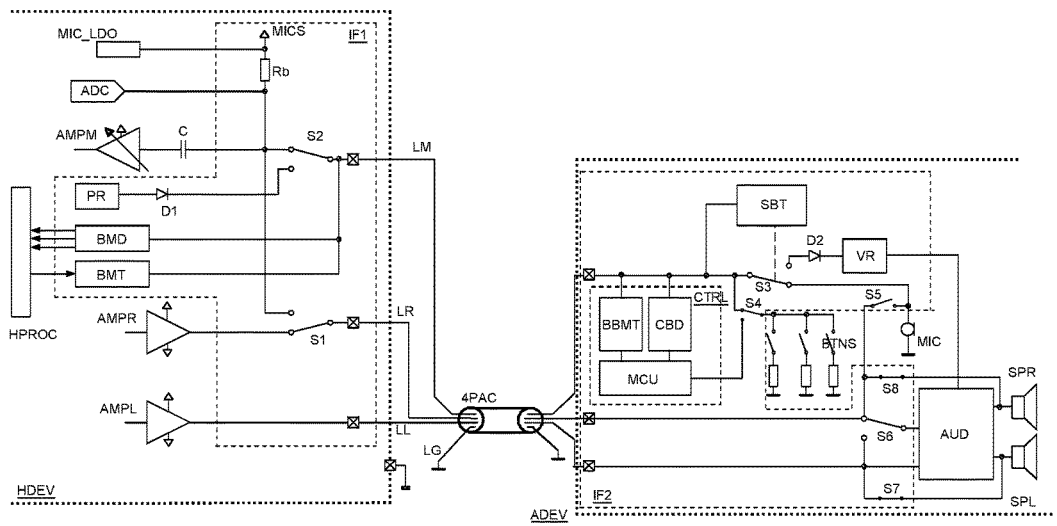
FIG. 3 shows an exemplary implementation of a host interface circuit according to the improved concept operating in the legacy mode and connected to an accessory interface circuit according to the improved concept operating in the legacy mode.
Figure 4:
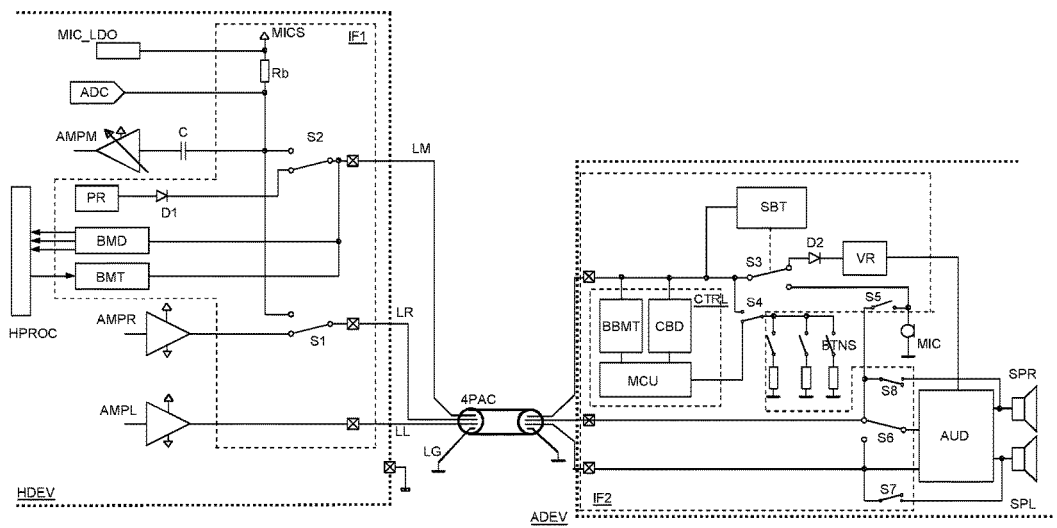
FIG. 4 shows an exemplary implementation of a host interface circuit according to the improved concept operating in the power mode and connected to an accessory interface circuit according to the improved concept operating in the power mode.
Figure 5:
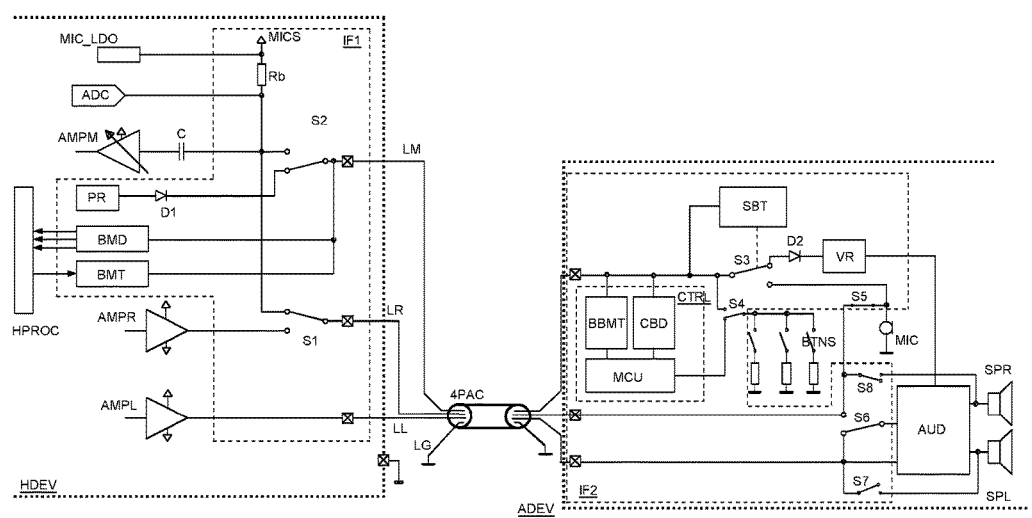
FIG. 5 shows an exemplary implementation of a host interface circuit according to the improved concept operating in the call mode and connected to an accessory interface circuit according to the improved concept operating in the call mode.

FIG. 3, FIG. 4 and FIG. 5 show an exemplary implementation of a host interface circuit IF1 according to the improved concept implemented in a host device HDEV and connected to an accessory device ADEV containing an accessory interface circuit IF2 according to the improved concept. The host device HDEV and the host interface circuit IF1 of FIGS. 3 to 5 are identical to the host device HDEV and the host interface circuit IF1 shown in FIG. 1. The accessory device ADEV and the accessory interface circuit IF2 of FIGS. 3 to 5 are identical to the accessory device ADEV and the accessory interface circuit IF2 shown in FIG. 2.

The host interface circuit IF1 and the accessory interface circuit IF2 are operating in the legacy mode in FIG. 3, in the power mode in FIG. 4 and in the call mode in FIG. 5.

After a start-up, the host interface circuit IF1 and the accessory interface circuit IF2 are operating in the legacy mode as shown in FIG. 3. The switching configuration of the host interface circuit IF1 is as described with respect to FIG. 1, the switching configuration of the accessory interface circuit IF2 is as described with respect to FIG. 2. After the start-up, the start-up burst mode transmitter SBT may be activated and configured to generate an identification signal, for example a burst signal, at the first line LM. The identification signal may for example be generated by modulating a signal to the first line LM, for example superimposed to a signal that may be generated by the microphone MIC. In particular, the modulated signal may feature a different signal amplitude and/or frequency, for example a higher signal amplitude, than the signal that may be generated by the microphone MIC. This may for example be carried out with an impedance in the order of kΩ, for example ~2 kΩ, to the bias voltage of the legacy terminal MICS.

The burst mode detector BMD of the host interface circuit IF1 may detect the identification signal, for example by means of detecting the different signal amplitude and/or frequency. In this way, the host interface circuit IF1 may determine that the accessory device ADEV is compatible with a power supply via the first line LM, in particular via the power regulator PR. As a response to this determination, the burst mode detector BMD and/or the processing unit HPROC may switch the second switch S2 to disconnect the microphone amplifier AMPM from and connect the power regulator PR via the first diode D1 to the first line LM.

Accordingly, the start-up burst mode transmitter SBT may detect an answer signal, that is for example a change of an impedance on the first line LM due to the switching of the second switch S2. As a result the start-up burst mode transmitter SBT may stop generating the identification signal and for example controls the third switch S3 to disconnect the microphone MIC from and connect the power input of the active device AUD via the second diode and the voltage regulator VR to the first line LM. The voltage regulator VR may for example adjust a voltage level for powering the active device AUD.

Furthermore, the fourth switch S4 may be controlled by the start-up burst mode transmitter SBT to disconnect the direct connection between the control means BTNS and the first line LM and to connect the control means BTNS to the control unit CTRL, for example to the microcontroller MCU or, in alternative implementations, to a further programmable logic circuit of the control unit CTRL. Alternatively. The fourth switch S4 may be controlled by the control unit CTRL. The seventh switch S7 and the eighth switch S8 are opened for example by the microcontroller MCU in order to disconnect the direct connections of the right speaker SPR to the third line LR and the left speaker SPL to the fourth line LL. The speakers LR, LL may then be operated via the active device AUD, that is for example via the data input of the active device AUD connected to the third line LR and a further data input of the active device AUD connected to the fourth line LL.

The resulting switch configuration corresponding to the power mode is shown in FIG. 4. With this configuration the active device AUD may now be powered, that is supplied with power via the first line LM and the power regulator PR. In the power mode the first line LM may act as a power supply line for example featuring a low impedance, for example a low output impedance. Consequently, the control means BTNS may for example not be directly connected to the first line LM for example for controlling a volume or a phone call. Due to the connection of the control means BTNS to the control unit CTRL, the control unit CTRL may detect an actuation, for example a pushing, of a component of the control means BTNS.

When an actuation of the control means BTNS occurs, the control means BTNS may effectively generate an actuation signal for example by means of changing a voltage level or an impedance on the connection between the control means BTNS and the control unit CTRL. The actuation signal may then be detected, in the shown example, by the microcontroller MCU or the further programmable logic circuit. As a response, the button burst mode transmitter BBMT may generate a button signal depending on the actuation signal on the first line LM for example by modulating a signal on the first line LM. To this end, the first diode D1, the second diode D2 and/or another suitable component may affect, for example increase, an impedance on the first line LM to increase a frequency range of the button burst mode transmitter BBMT.

For example depending on a current consumption of the accessory device ADEV, in particular the active device AUD, an impedance of the diodes D1, D2 may change and allow for the modulation of the signal on the first line LM by the button burst mode transmitter BBMT. The button signal, that is the modulation of the signal on the first line LM by the button burst mode transmitter BBMT, may be detected by the burst mode detector BMD of the host interface circuit IF1. Based on the detection of the button signal, the burst mode detector BMD may communicate with the processing unit HPROC, in particular supplying information about which component of the control means BTNS has been actuated, how long it has been actuated or the like.

For example in implementations where the host device HDEV is a mobile communications device, the call mode of operation may be activated for example when a phone call arrives at the host device HDEV or when the user initiates a phone call or a spoken command while the interface circuits IF1, IF2 are operating in the power mode. In such a case, a user may for example press a call button of the control means BTNS to accept or initiate the phone call or to initiate the spoken command. As described above, this results in the control means generating an actuation signal which is in the case of the call button being pressed an actuation call signal. As explained above for the actuation signal and the button signal, the actuation call signal may then be detected for example by the microcontroller MCU or the further programmable logic circuit. As a response, the button burst mode transmitter BBMT may generate an accessory call signal depending on the actuation call signal on the first line LM for example by modulating a signal on the first line LM.

Furthermore, depending on the detection of the actuation call signal, the microcontroller MCU may switch the sixth switch S6 to disconnect the data input of the active device AUD from the second line LR and connect it, together with the further data input of the active device AUD, to the fourth line LL. For example if during power mode the third line LR is used for transmitting a right audio signal and the fourth line LL is used for transmitting a left audio signal, the switching of the sixth switch S6 effectively results in a single channel or monophonic audio operation of the active device AUD.

Depending on the actuation call signal, the microcontroller MCU may also close the fifth switch S5 to connect the microphone MIC to the second line LR, which is now available for microphone signals due to the disconnection of the data input of the active device AUD from the second line LR.

On the side of the host device HDEV, the accessory call signal may then be detected by the burst mode detector BMD which transfers the information about the user having accepted the phone call to the processing unit HPROC. Consequently, the first switch S1 may be switched by the processing unit HPROC and/or the burst mode transmitter to disconnect the left audio amplifier AMPL from the third line LR and connect the legacy terminal MICS and the microphone amplifier AMPM to the third line LR.

The resulting switching configuration of the call mode is shown in FIG. 5.

Alternatively, the call mode may also be activated by the user accepting the phone call or initiating a phone call or initiating a spoken command directly at the host device HDEV instead of pressing a button of the control means BTNS. In such a case, the processing unit HPROC may send a host call signal to the burst mode transmitter BMT which in turn generates an uplink call signal at the first line LM depending on the host call signal. The uplink call signal may then be detected by the call burst detector CBD and the switching of the fifth switch S5 and the sixth switch S6 may be carried out by the microcontroller MCU depending on the uplink call signal instead of depending on the actuation call signal as described above.

The call mode may for example be ended and the power mode be activated when for example the phone call ends. The ending of the phone call may for example be accompanied by an attenuation of the call button or another component of the control means BTNS. The changing of the switching configurations may then be carried out analogously to when entering the call mode as a response of the user accepting the phone call by pressing the call button, as described above. Alternatively or additionally, the processing unit HPROC may generate a signal indicating to the interface circuits IF1, IF2 to enter the power mode again. This may be carried out analogously to when the phone call is accepted directly at the host device HDEV, as described above.

By means of the improved concept, in particular by means of a host interface circuit, an accessory interface circuit, a communication system and/or a method according to the improved concept, communication between an accessory device and a host device may be achieved. Therein a host interface circuit may operate in the legacy mode when connected to an accessory device that is or is not compatible with a power supply via a data cable, in particular via a 4-pole audio cable.

Analogously, an accessory interface circuit according to the improved concept may operate in the legacy mode when connected to a host device that is or is not capable of supplying a power for the active device via the first line.

When a host device comprising a host interface circuit according to the improved concept is connected to an accessory interface circuit according to the improved concept, the host interface circuit and the accessory interface circuit may operate in the power mode and/or in the call mode, depending on the specific implementation of the host device and the accessory device. In the power mode, an active device, implemented in the accessory device may be supplied with power via the first line of the data cable.

In the call mode, the active device may still be powered via the first line. In case of an active audio device, a playback mode may be changed from stereophonic to monophonic playback during the call mode. In this way, the released audio line may be used for the transfer of microphone data.

One example for the accessory device is a headphone with an active noise cancelling device as an active device. However, in principle any kind of active device may be powered via the first line in the described way. In alternative implementations, the active device may be a sensor to be powered via the first line. In such an implementation, the accessory may or may not comprise a passive device such as the microphone in the described implementations. In implementations without a microphone, the skilled reader straight forwardly may adapt the described implementations accordingly. In particular, the accessory device may not be operated in the legacy mode in such a case.

In other implementations, for example in such implementations where the accessory device does not comprise a microphone, the data cable may also be implemented as a 3-pole data cable, for example a 3-pole audio cable. Corresponding implementations of the interface circuits, the communication system and the method follow readily from a corresponding adaption.

The invention claimed is:

1. A host interface circuit to be implemented in a host device with a processing unit, wherein the host device is a mobile communication device and/or a sound reproducing device, the host interface circuit suitable for coupling the host device to an accessory device via a data cable, the host interface circuit comprising a power regulator and a legacy terminal and configured to
  operate in a power mode of operation when connected to an accessory device being compatible with a power supply via a first line of the data cable;
  to couple the power regulator to the first line when operating in the power mode;
  to operate in a call mode of operation when connected to an accessory device being compatible with a power supply via the first line;
  to couple the power regulator to the first line and the legacy terminal to a second line of the data cable when operating in the call mode;
  to operate in a legacy mode of operation when connected to an accessory device being not compatible with a power supply via the first line; and
  to couple the legacy terminal to the first line when operating in the legacy mode.

2. The host interface circuit according to claim 1, configured to determine if the accessory device is compatible with a power supply via the power regulator based on an identification signal.

3. The host interface circuit according to claim 2, configured to detect the identification signal being received from the accessory device via the first line, when the host device is connected to the accessory device.

4. The host interface circuit according to claims 1, configured to operate in the legacy mode after a start-up of the host-interface circuit.

5. The host interface circuit according to claim 1, configured to
  detect a host call signal from the processing unit;
  to detect an accessory call signal received from the accessory device via the first line; and
  to trigger the operation in the call mode when at least one of the host call signal and the accessory call signal is detected.

6. The host interface circuit according to claim 5, configured to generate an uplink call signal to be transmitted to the accessory device via the first line after the triggering of the operation in the call mode.

7. The host interface circuit according to claim 1, configured to, in particular when operating in the power mode,
  detect a button signal from the accessory device via the first line;
  to generate an adapted button signal based on the button signal; and
  to provide the adapted button signal to the processing unit.

8. An accessory interface circuit to be implemented in an accessory device containing an active audio device, the accessory interface circuit suitable for coupling the accessory device to a host device via a data cable, the accessory interface circuit comprising a microphone and being configured to
  operate in a power mode of operation when connected to a host device being capable of providing a power supply for operating the active audio device via a first line of the data cable;
  to couple a power input of the active audio device to the first line when operating in the power mode; and
  to couple a data input of the active audio device to a second line of the data cable when operating in the power mode;
  to operate in a call mode of operation if the host device is capable of providing a power supply for operating the active audio device via the first line;
  to couple the power input of the active audio device to the first, the microphone to the second line and the data input of the active audio device to a third line of the data cable when operating in the call mode;
  to operate in a legacy mode of operation when connected to a host device being not capable of providing a power supply for operating the active audio device via the first line; and
  to couple the microphone to the first line when operating in the legacy mode.

9. The accessory interface circuit according to claim 8, configured to determine if the host device is capable of providing a power supply for operating the active audio device based on an answer signal.

10. The accessory interface circuit according to claim 9, configured to
  generate an identification signal to be transmitted to the host device via the first line when the accessory device is connected to the host device;
  to detect the answer signal being received from the host device via the first line in response to the identification signal.

11. The accessory interface circuit according to claim 8, configured to
  Detect an actuation call signal from a control element of the accessory device;
  to provide an accessory call signal depending on the actuation call signal to the host device via the first line;
  to detect an uplink call signal received from the host device via the first line and
  to trigger the operation in the call mode when at least one of the uplink call signal and the actuation call signal is detected.

12. The accessory interface circuit according to claim 8, configured to, in particular when operating in the power mode,
  detect an actuation signal from the control element; and
  to provide a button signal depending on the actuation signal to the host device via the first line.

13. A method for communication between a host device and an accessory device, wherein the host device is a mobile communication device and/or a sound reproducing device and the method comprises connecting the host device and the accessory device via a data cable;
  detecting, by means of the host device, whether the accessory device is compatible with a power supply via a first line of the data cable;
  operating the host device in a power mode of operation, in a call mode of operation or in a legacy mode of operation depending on the detection;

providing a power supply from the host device to the accessory device via the first line when the host device is operated in the power mode;

providing the power supply from the host device to the accessory device via the first line and coupling a legacy terminal of the host device to a second line of the data cable when operating in the call mode; and coupling the legacy terminal to the first line when the host device is operated in the legacy mode.

14. The method according to claim 13, wherein the detecting whether the accessory device is compatible with the power supply via the first line is based on an identification signal.

15. The method according to claim 14, further comprising detecting the identification signal being received from the accessory device via the first line.

16. A method for communication between a host device and an accessory device with an active audio device and a microphone, wherein the method comprises connecting the host device and the accessory device via a data cable;

detecting, by means of the accessory device, whether the host device is capable of providing a power supply for operating the active audio device via a first line of the data cable;

operating the accessory device in a power mode of operation, in a call mode of operation or in a legacy mode of operation depending on the detection;

coupling a power input of the active audio device to the first line when the accessory device is operated in the power mode;

coupling a data input of the active audio device to a second line of the data cable when the accessory device is operated in the power mode;

coupling the power input of the active audio device to the first line, the microphone to the second line and the data input of the active audio device to a third line of the data cable when operating in the call mode; and coupling the microphone to the first line when operating in the legacy mode.

17. The method according to claim 16, wherein the detecting whether the host device is capable of providing the power supply for operating the active audio device via the first line is based on an answer signal.

* * * * *

UNITED STATES PATENT AND TRADEMARK OFFICE
CERTIFICATE OF CORRECTION

PATENT NO. : 10,218,410 B2
APPLICATION NO. : 15/514483
DATED : February 26, 2019
INVENTOR(S) : Horst Gether and Helmut Theiler Page 1 of 1

It is certified that error appears in the above-identified patent and that said Letters Patent is hereby corrected as shown below:

On the Title Page

Item [56]:
Column 2, Line 1, under "FOREIGN PATENT DOCUMENTS", delete "10/2012" and insert -- 9/2012 --.

In the Claims

Column 13, Claim 4:
Line 43, delete "claims" and insert -- claim --.

Column 14, Claim 8:
Line 18, delete "first," and insert -- first line, --.

Column 14, Claim 11:
Line 42, delete "Detect" and insert -- detect --.

Signed and Sealed this
Thirtieth Day of April, 2019

Andrei Iancu
*Director of the United States Patent and Trademark Office*